United States Patent
Pedrotti

(10) Patent No.: US 12,258,642 B2
(45) Date of Patent: Mar. 25, 2025

(54) METHOD OF INDUCTION-HARDENING A ROLLING-ELEMENT BEARING RING

(71) Applicant: AKTIEBOLAGET SKF, Gothenburg (SE)

(72) Inventor: Klaus Pedrotti, Münnerstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 38 days.

(21) Appl. No.: 18/120,610

(22) Filed: Mar. 13, 2023

(65) Prior Publication Data
US 2023/0220505 A1  Jul. 13, 2023

Related U.S. Application Data

(63) Continuation of application No. 16/403,657, filed on May 6, 2019, now abandoned.

(30) Foreign Application Priority Data

May 18, 2018 (DE) .......................... 102018207904.8

(51) Int. Cl.
*C21D 1/10* (2006.01)
*C21D 1/18* (2006.01)
(Continued)

(52) U.S. Cl.
CPC .................. *C21D 1/10* (2013.01); *C21D 1/18* (2013.01); *C21D 1/62* (2013.01); *C21D 9/40* (2013.01); *F16C 33/64* (2013.01); *C21D 9/0062* (2013.01)

(58) Field of Classification Search
CPC ... C21D 1/10; C21D 1/18; C21D 1/62; C21D 9/40; C21D 9/0062; C21D 1/667; F16C 33/64; Y02P 10/25
See application file for complete search history.

(56) References Cited

U.S. PATENT DOCUMENTS

2008/0141535 A1* 6/2008 Rollmann ................ C21D 1/18
29/898.066
2016/0376678 A1 12/2016 Wagner

FOREIGN PATENT DOCUMENTS

CN  101111614 A  1/2008
CN  104120218 A  10/2014
(Continued)

OTHER PUBLICATIONS

Office Action from the Chinese Patent Office dispatched Mar. 3, 2022 in related Chinese application No. 201910409668.4, and translation thereof.
(Continued)

*Primary Examiner* — Rebecca Janssen
(74) *Attorney, Agent, or Firm* — J-TEK LAW PLLC; Scott T. Wakeman; Mark A. Ussai

(57) ABSTRACT

A method of induction hardening a bearing ring includes positioning first and second inductors at a start zone on the bearing ring and a preheat inductor in an end zone on the bearing ring spaced one hundred eighty degrees from the start zone. A first traversing element moves the first inductor circumferentially from the start zone toward the end zone along a first half of the bearing ring circumference while the first inductor heats the bearing ring, and a second traversing element moves the second inductor circumferentially from the start zone toward the end zone along a second half of the bearing ring circumference while the second inductor heats the bearing ring. A third traversing element moves the preheat inductor circumferentially within the end zone so as to traverse a portion of each half of the bearing ring circumference while the preheat inductor heats the end zone.

17 Claims, 5 Drawing Sheets

(51) Int. Cl.
*C21D 1/62* (2006.01)
*C21D 9/00* (2006.01)
*C21D 9/40* (2006.01)
*F16C 33/64* (2006.01)

(56) References Cited

FOREIGN PATENT DOCUMENTS

| | | | |
|---|---|---|---|
| CN | 204058525 U | 12/2014 | |
| CN | 106282504 A | 1/2017 | |
| DE | 102008033735 A1 | 2/2010 | |
| EP | 2801628 A2 | 11/2014 | |
| IT | TO20100173 A1 | 9/2011 | |
| JP | H06200326 A | 7/1994 | |
| WO | 2006087152 A2 | 8/2006 | |
| WO | WO-2011107869 A1 * | 9/2011 | ............... C21D 1/10 |

OTHER PUBLICATIONS

Search Report from the Chinese Patent Office dispatched Feb. 23, 2022 in related Chinese application No. 201910409668.4, and translation thereof.

\* cited by examiner

METHOD OF INDUCTION-HARDENING A ROLLING-ELEMENT BEARING RING

CROSS-REFERENCE TO RELATED APPLICATIONS

This application is a continuation of pending U.S. patent application Ser. No. 16/403,657, filed May 6, 2019, which claims priority to German patent application no. 102018207904.8 filed on May 18, 2018, the contents of both of which are fully incorporated herein by reference.

FIELD OF THE INVENTION

The present invention relates to an induction-hardening system for induction hardening a large rolling-element bearing ring according to the preamble of patent claim 1, and a method for hardening a large rolling-element bearing ring using such an induction-hardening system.

BACKGROUND OF THE INVENTION

Rolling-element bearings, and in particular large rolling-element bearings, are readily subjected to an induction hardening method for hardening the raceway, wherein here an induction hardening feed method is used in which one or two inductors move along on the circumference of the bearing ring and they successively heat and then quench. In particular with two inductors that traverse the bearing ring in opposite circumferential directions a region can be reached in an end zone wherein the two inductors meet, which region cannot be sufficiently quenched with the result that an optimum hardness result cannot be achieved.

In order to counter this problem a method has been proposed, for example, in WO 2006/087152, in which the quenching sprayers of the inductors are pivoted such that they inject quenching fluid in a region below the inductors such that quenching is also possible in the end zone.

However, disadvantageously with this method, sufficient space must be provided for the pivoting of the spray jet in the space between raceway surface and inductor, which space often cannot be adequately provided. The quenching thus does not occur uniformly, with the result that differences in the resulting microstructure can occur. Furthermore, for such a solution the sprayers must be designed both for quenching in the process and for quenching in the end zone, with the result that in particular an adapting to the contour of the ring is not possible. The bearing ring is also thereby non-uniformly quenched, with the result that an optimum hardness result cannot be achieved.

It is therefore the object of the present invention to provide an induction-hardening system wherein a uniform hardness result is possible over the entire circumference and the entire contour of the bearing ring.

BRIEF SUMMARY OF THE INVENTION

This object is achieved by an induction-hardening system according to patent claim 1, as well as a method according to patent claim 12.

In the following an induction-hardening system for induction hardening a bearing ring is presented including a first inductor and a second inductor that each include a heating element for heating the bearing ring to be hardened and a quenching device for quenching the bearing ring heated by the heating element. Here the first and the second inductor are respectively disposed on a first and on a second traversing element, wherein the traversing elements are configured to move the first and second inductor in respectively opposing directions along the circumference of the bearing ring from a start zone to a diametrically opposing end zone. Here the first and second inductors are further designed to heat the bearing ring from the start zone up to the end zone and to quench after the heating.

In order to now make possible a particularly uniform heating and in particular quenching, at least one third quenching device is further provided in the region of the end zone, which third quenching device is designed to replace the first and the second quenching device in the end zone. Due to this replacement it is made possible that even in the end zone an optimized quenching and thus an optimum hardness can be achieved. In particular this design makes it possible, as a further preferred exemplary embodiment shows, that all quenching devices, i.e., the first, second, and at least one third quenching device are adapted to the contour of the bearing ring, so that a particularly uniform quenching along the contour of the bearing ring is made possible.

It is to be noted here that a further quenching sprayer fixedly connected to the heating element can be present on at least one of the heating elements.

Furthermore, an induction hardening system is preferred in particular wherein a third and a fourth quenching device are provided, wherein the third quenching device is configured to replace the first quenching device in the end zone, and the fourth quenching device is configured to replace the second quenching device in the end zone. A seamless transition or exchange of first to third, or second to fourth quenching device can thereby be undertaken.

According to a further advantageous exemplary embodiment, a third traversing element is further provided, on which a third inductor including a third heating element is disposed, which is configured to preheat the end zone of the bearing ring preferably during the operation of the first and second inductor. Since the first and second inductor abut against each other in the end zone, in this abutment region the bearing ring can be heated only inadequately. A third inductor is therefore provided that, even while the first and second inductor traverse the bearing ring, preheats the end zone in this region so that even in the end zone an optimum hardness result is achievable.

In order to make possible an exchange of the quenching devices in the end zone, it is furthermore advantageous if at least the at least one third quenching device is attached to the third traversing element, wherein the at least one third quenching device is disposed and designed such that with operation of the third inductor in the end zone the quenching device is inactive, that is, that no quenching is effected by the third quenching device. If the third quenching device were used directly with the third inductor, then due to the later passing over with the first/second inductor, upon reaching into the end zone of the first or second inductor the already quenched location on the bearing ring would heat again, which would result in a deterioration of the microstructure. In this respect only, a preheating of the bearing ring is achieved via the third inductor and no quenching is performed. Quenching is affected only after the hardening treatment by the first or second inductor.

According to a further advantageous exemplary embodiment the third traversing element is further designed and controllable such that with a movement of the third traversing element for removing the third inductor from the bearing ring the at least one third quenching device is movable into a position from which it is bringable into an operative position. Since the third inductor must be removed from the bearing ring anyway when the first and second inductor approach the end zone in order to perform a hardening there, the simultaneous movement of the at least one third quenching device into a position from which it is bringable into an operative position on the bearing ring makes possible a very simple possibility to move quenching device and induction device simultaneously.

In order to enable an exchange of the first and the second quenching devices with the at least one, or the third, or the third and fourth, quenching device, it is furthermore advantageous if the first, second, and/or the at least one third, or the third and fourth, quenching device are each attached to a first, second, and/or at least third, in particular third and fourth, carrier element that is movable independently from the heating element of the associated inductor. Here the respective carrier elements are configured to bring the corresponding quenching device into the operative position on the bearing ring to be processed or to remove it from the operative position thereon.

It is advantageous in particular here if the carrier elements are controllable such that a removing of the first and/or second quenching device from the operative position on the bearing ring effects an essentially simultaneous bringing-into-operative-position of the at least one third, in particular of the third and fourth, quenching device on the bearing ring. A particularly rapid transition from first to third, or second to fourth, quenching device can thereby be achieved so that an interruption-free quenching is made possible.

According to a further advantageous exemplary embodiment the at least one third traversing element and/or the at least one third carrier element is further configured to move the at least one third quenching device in the end zone on the bearing ring in the circumferential direction. It can be ensured by this circumferential movement that the third, in particular third and fourth quenching device, also follows the first or second heating element. In addition, after removal of the first and second inductor from the bearing surface the at least one third quenching device, in particular the third and fourth quenching device, can quench the bearing region disposed below the first and second inductor device by the third traversing element and/or the third carrier element moving the corresponding quenching device circumferentially over this zone.

In order, as mentioned above, to remove the first and second heating element of the first or second inductor from the bearing ring, it is furthermore advantageous if the respective heating element of the first and second inductor are correspondingly disposed on a fifth or sixth carrier element, and the fifth and sixth carrier element and/or the first and second traversing element are configured to remove the first and second heating element from the operative position on the bearing ring when the first and second inductor cannot be moved further toward each other in the end zone.

Furthermore, an exemplary embodiment is advantageous wherein the third traversing element includes a third and a fourth carrier element that correspondingly carry the third and the fourth quenching device, bring them into the operative position on the bearing ring, and move them toward each other in the circumferential direction. A successive and particularly good quenching of the bearing ring can also be achieved in the end zone.

Due to the replacement of the first and second quenching device by the at least one third quenching device in the end zone, an exemplary embodiment can furthermore be made possible wherein at least one of the heating elements and/or at least one of the quenching devices, preferably all heating elements and/or all quenching devices, are adapted to the contour of the bearing ring. On the one hand an optimized induction result as well as an optimized quenching result can thereby be achieved, so that overall the bearing ring shows an optimized hardness result both over the circumference and along the contour.

A further aspect of the present invention relates to a method for hardening a bearing ring wherein an induction-hardening system as described above is used. The properties described for the induction-hardening system apply to the method in an analogous manner.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWINGS

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION OF THE INVENTION

Figure 1:
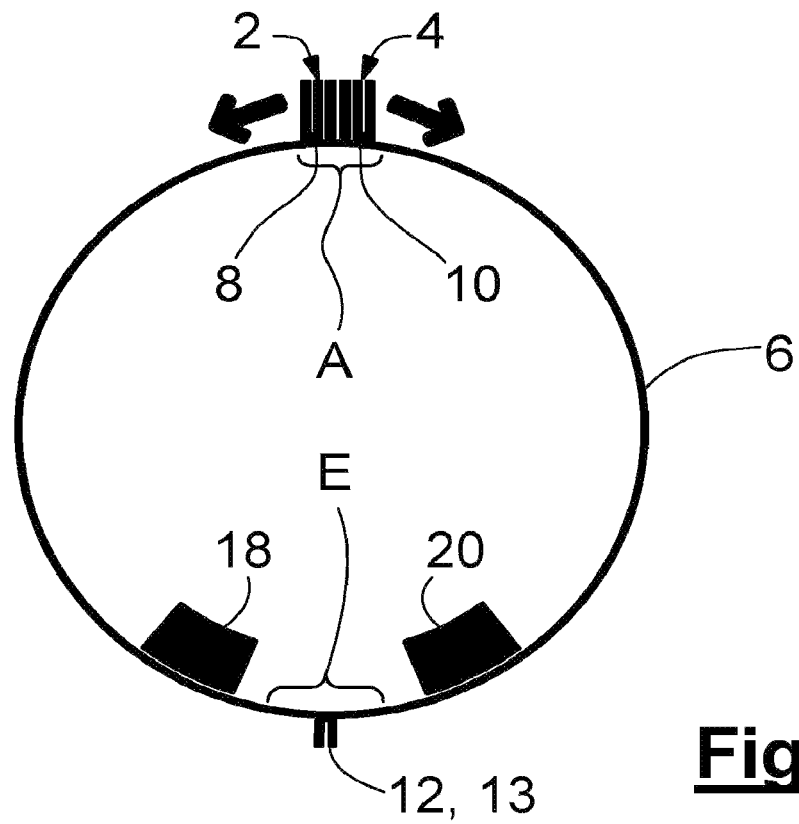
FIG. 1-FIG. 9 show schematic depictions of an induction-hardening system m traversing operation.

In the following, identical or functionally equivalent elements are designated by the same reference numbers.

FIGS. 1 to 9 schematically show an induction-hardening system 1 according to the present invention in operation. Here the induction hardening system 1 includes a first inductor 2 and a second inductor 4 that are moved along on a bearing ring 6 in opposite circumferential directions (see arrows) in order to harden the bearing ring 6. Here the bearing ring 6 is depicted in the Figures as an inner ring including radially outer-lying raceway. However, it should be noted that differently arranged raceways or outer rings can also be hardened similarly, wherein the inductors are then correspondingly disposed on the respective raceways or regions to be hardened and traverse them. Thus, for example, with an outer ring the raceway to be hardened is disposed radially inward and thus the inductors 2, 4 also traverse the radially inwardly facing raceway.

The first and second inductors 2, 4 each include a heating element 8, 10. The inductors 2, 4 are initially disposed in a start zone A and move circumferentially along the bearing ring 6 to an end zone E. Such an operation is called feed operation. As can further be seen from FIG. 1, in the end zone E a third inductor 12 including a heating element 13 can be disposed that heats the end zone E.

As soon as the inductors 2, 4 move out of their start position, as depicted in FIG. 1, quenching devices 14, 16 are brought onto the bearing ring, which quenching devices follow the movement of the heating elements 8, 10. As can also be seen from FIG. 2, for a preheating of the end zone E the third inductor 12 is moved back and forth in order to heat the end zone E. In order to provide the movement of the inductors 2, 4, 12, the inductors 2, 4, 12 are preferably disposed on not-depicted traversing elements that provide a traversing movement of the inductors in the circumferential direction. Also, not depicted are carrier elements that make possible a pivoting of the quenching devices 14, 16 after the heating elements 8, 10 as soon as the inductors 2, 4 have a sufficient spacing with respect to each other with the aid of their traversing elements.

A third and a fourth quenching device 18, 20 can furthermore be disposed on the traversing element of the third inductor 12. Of course, the third and fourth quenching devices 18, 20 can also be disposed on separate traversing elements.

Figure 2:
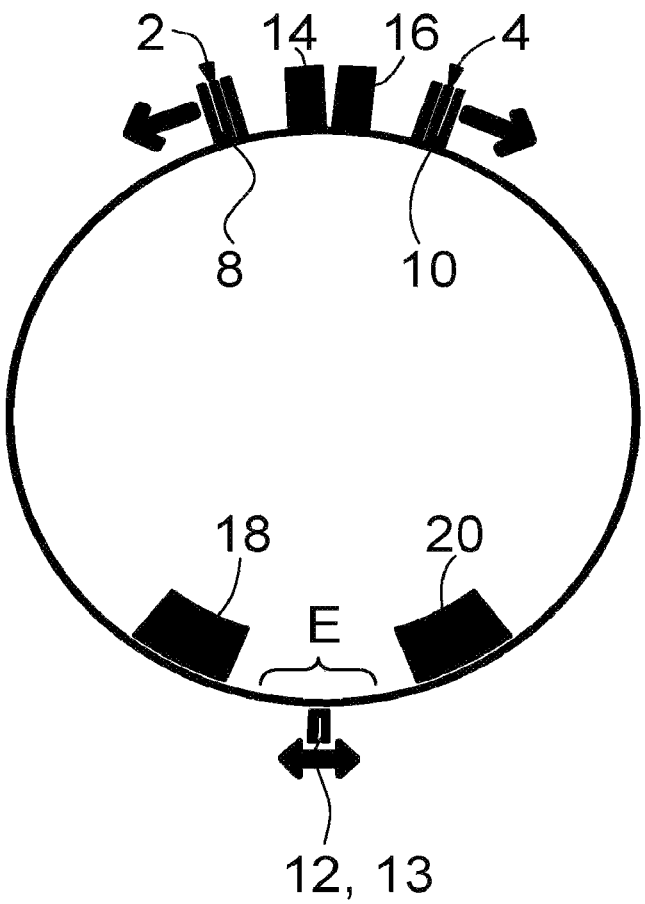

As can be seen from FIGS. 1 and 2, the third and fourth quenching devices 18, 20 are inactive in an initial stage, and they are preferably disposed in the radial interior of the bearing ring 6. In the case of an outer ring, in the inactive state the third and fourth quenching devices 18, 20 can be disposed outside the bearing ring.

Figure 3:
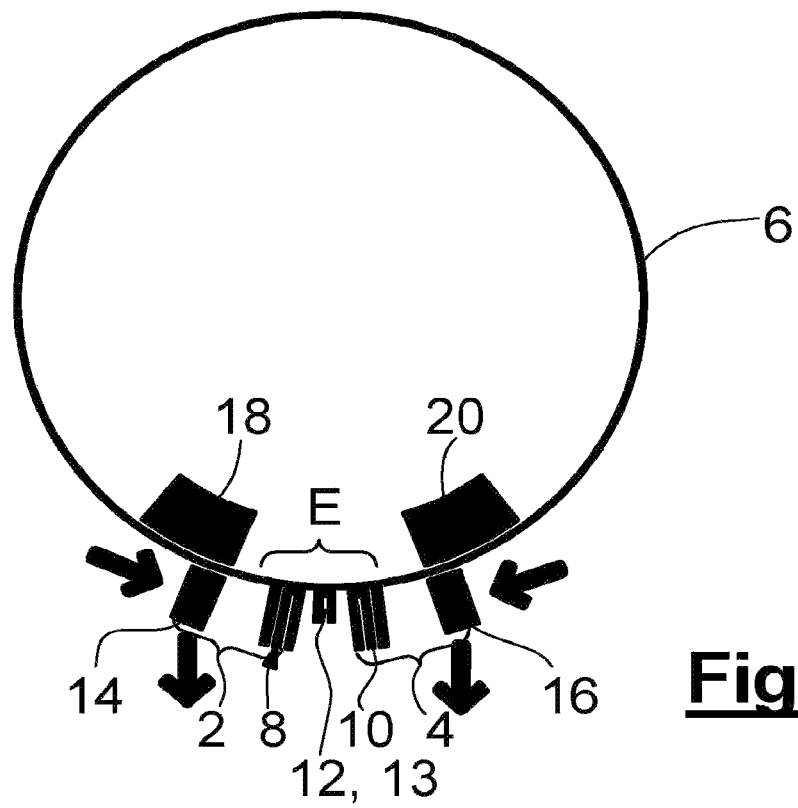
Figure 4:
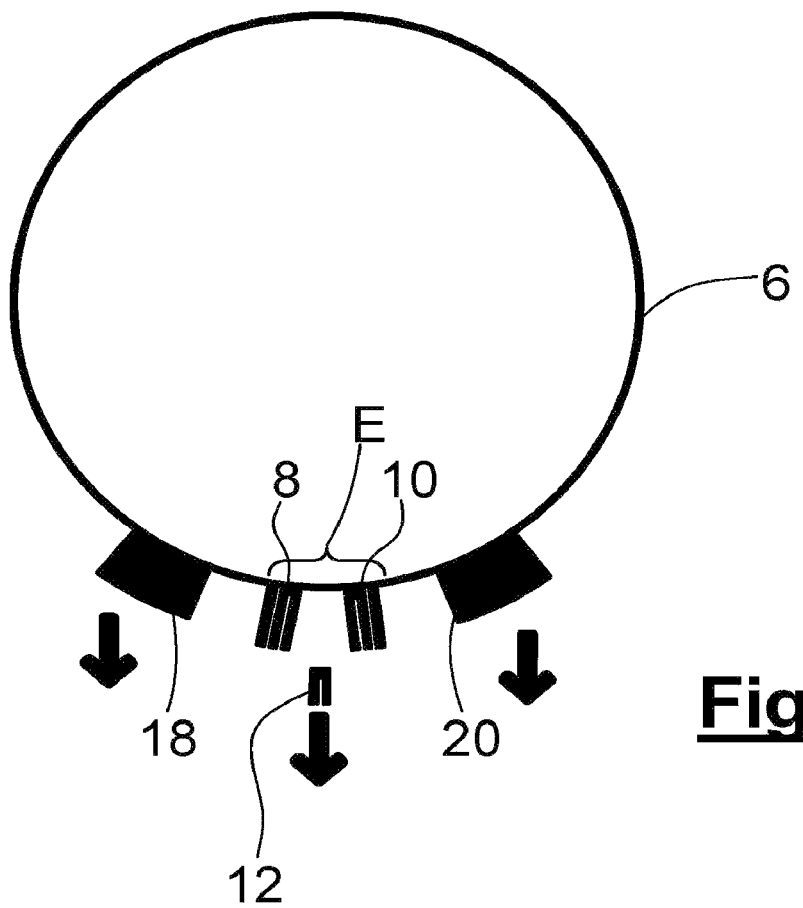
Figure 5:
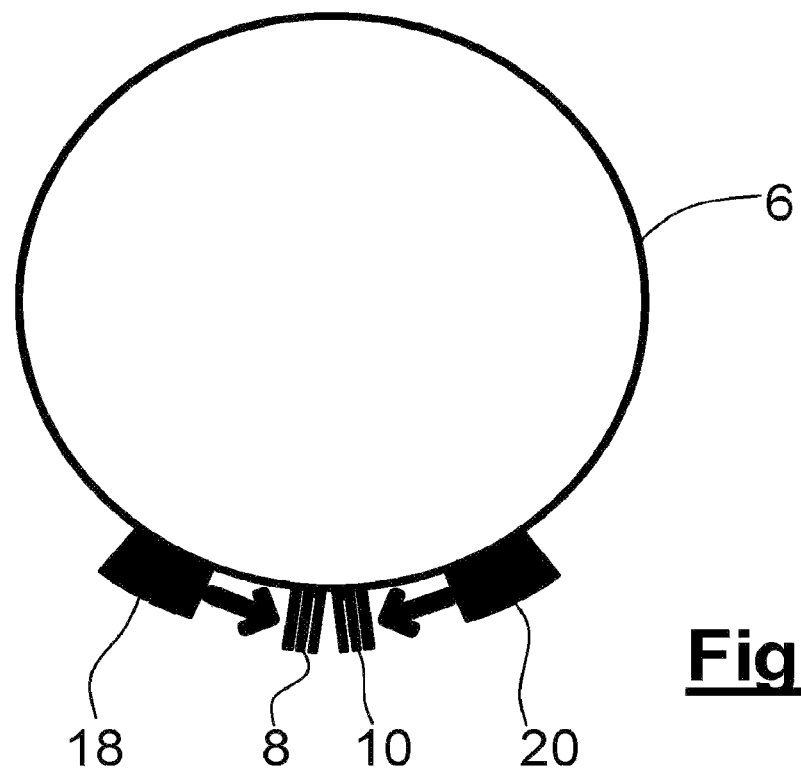
Figure 6:
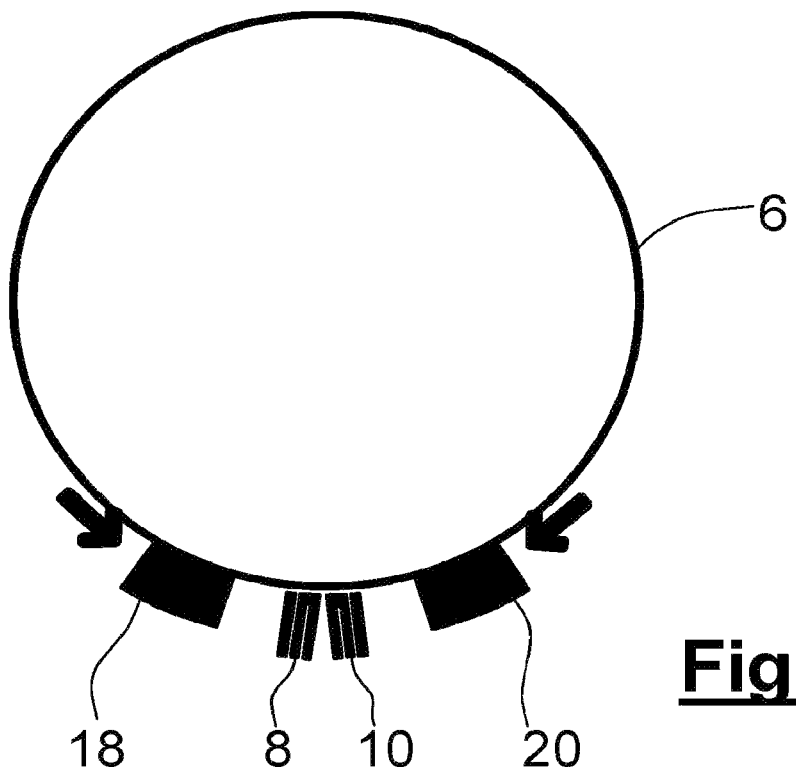
Figure 7:
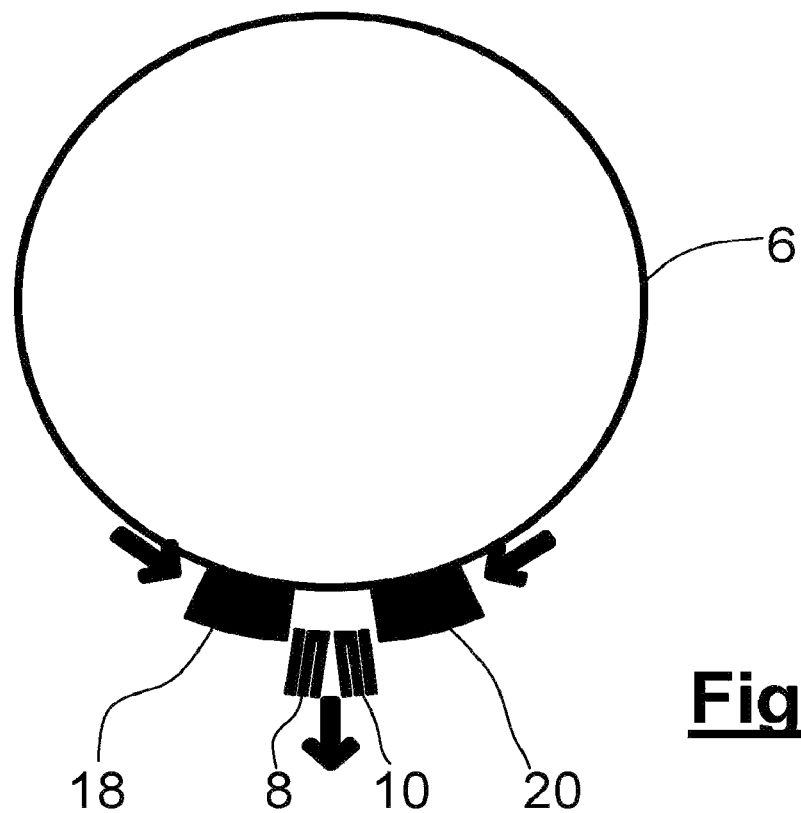

If, as depicted in FIG. 3, the inductors 2, 4 enter with their heating elements 8, 10 into the end zone E, the first and second quenching devices 14, 16 are replaced by the third and fourth quenching device 18, 20 as depicted in FIG. 4. This preferably occurs simultaneously with a removal of the third inductor 12 from the bearing ring so that the heating elements 8, 10 and the third and fourth quenching devices 18, 20 continue the inductive hardening in the end zone E of the heating element. For this purpose, the heating elements 8, 10 are moved further toward each other (see FIG. 5) until the heating elements 8, 10 abut against each other and cannot be moved further toward each other (see FIG. 6). Simultaneously with the heating elements 8, 10 the quenching devices 18, 20 are also moved further in the circumferential direction and thus assume the function of the first and second quenching device 14, 16.

Figure 8:
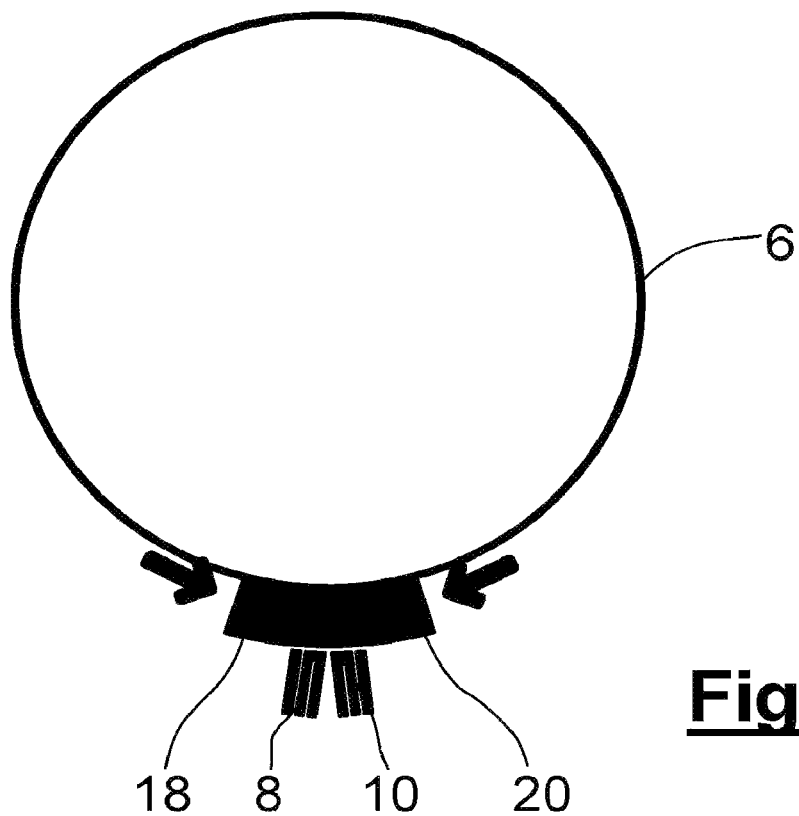
Figure 9:
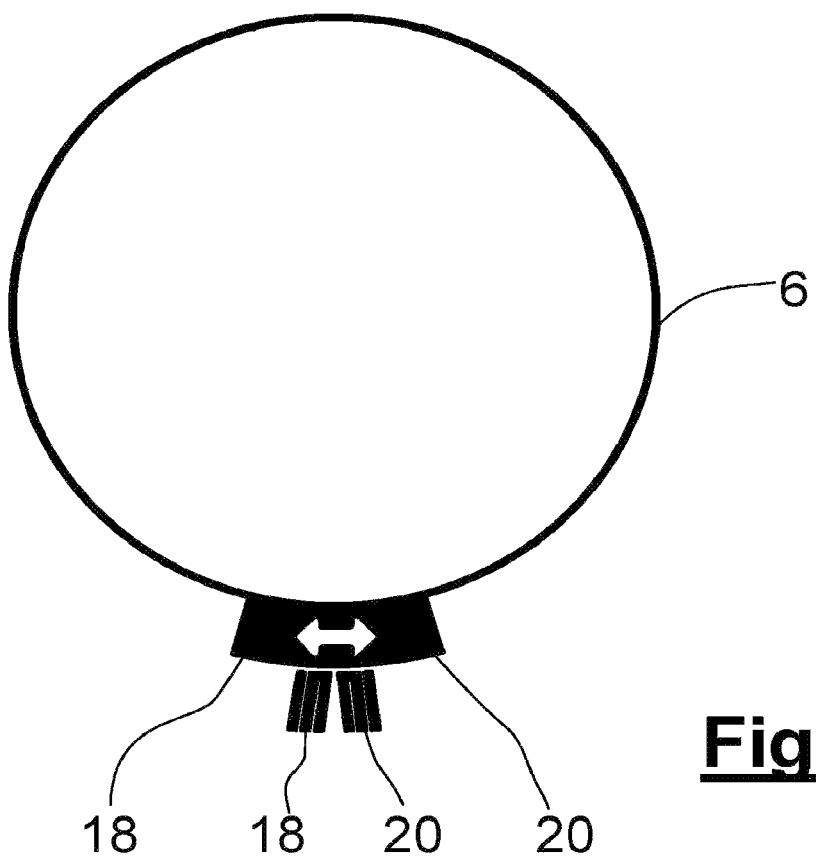

If the heating elements 8, 10 have reached a point at which they cannot be moved further toward each other, and the end zone E is sufficiently heated, the heating elements 8, 10 are removed from the bearing ring 6 (see FIG. 7), while the third and fourth quenching devices 18, 20 are moved further toward each other until they are in abutment (see FIG. 8). In order to achieve a particularly good result, the third and fourth quenching devices, as shown in FIG. 9, are pivoted back and forth in the circumferential direction.

In order to provide the rapid exchange of first and second quenching device 14, 16 with third and fourth quenching device 18, 20, the quenching device 14, 16, 18, 20 are advantageously disposed on carrier elements that are independent from the heating elements 8, 10, 12, which carrier elements can correspondingly bring the elements into the operative position on the bearing ring 6 and out of the operating position on the bearing ring 6.

Since in operation the heating elements 8, 10, 13 are always disposed, exactly like the quenching devices 14, 16, 18, 20, in direct and identically spaced position on the bearing ring, and no tilting or pivoting of the components themselves occurs, these components can be adapted to the contour of the bearing ring. This adapting to the contour makes possible a particularly uniform and thus optimized induction hardening, since no local heating- or quenching-differences arise in the region of the respective heating elements or in the quenching devices.

Thus, overall with the proposed induction-hardening system a bearing ring, in particular for a large rolling-element bearing, can be hardened in an optimum manner so that both in the start zone and in the end zone neither the heating nor the quenching is interrupted and thus a tempering of the already hardened region could occur. Thus, no soft locations arise on the bearing ring and a differentiated quenching is possible. Due to the oscillation of the quenching unit at the end of the hardening process or in the end zone a uniform quenching picture is also obtained.

REFERENCE NUMBER LIST

1 Induction-hardening system
2, 4, 12 Inductor
6 Bearing ring
8, 10 13 Heating element
14, 16, 18, 20 Quenching device
A Start zone
E End zone

The invention claimed is:

1. A method of induction-hardening a bearing ring, the method comprising the steps of:
   providing a first inductor mounted on a first traversing element, a second inductor mounted on a second traversing element, and a preheating inductor mounted on a third traversing element;
   positioning the first and second inductors at a start zone on the bearing ring;
   positioning the preheat inductor in an end zone on the bearing ring spaced one hundred eighty degrees from the start zone;
   operating the first traversing element such that the first inductor is moved circumferentially from the start zone toward the end zone along a first half of the circumference of the bearing ring while the first inductor heats the bearing ring;
   operating the second traversing element such that the second inductor is moved circumferentially from the start zone toward the end zone along a second half of the circumference of the bearing ring while the second inductor heats the bearing ring; and
   operating the third traversing element such that the preheat inductor moves circumferentially within the end zone so as to traverse a portion of each one of the first and second halves of the circumference of the bearing ring while the preheat inductor heats the end zone of the bearing ring;
   wherein the step of operating the third traversing element includes moving the preheat inductor circumferentially back and forth within the end zone.

2. The method as recited in claim 1, further comprising the step of removing the preheat inductor from the bearing ring when the first and second inductors enter the end zone.

3. The method as recited in claim 1, wherein:
   a first quenching device is mounted on the first traversing element, a second quenching device is mounted on the second traversing element and a third quenching device is mounted on the third traversing element;
   the step of operating the first traversing element includes moving the first quenching device to follow the first inductor such that the first quenching device quenches portions of the bearing ring heated by the first inductor;
   the step of operating the second traversing element includes moving the second quenching device to follow the second inductor such that the second quenching device quenches portions of the bearing ring heated by the second inductor; and
   the method further comprises the steps of:
      removing the preheat inductor from the bearing ring and at least one of the first and second quenching devices from the bearing ring when the first and second inductors enter the end zone; and positioning the third quenching device on the bearing ring to replace the one of the first and second quenching devices within the end zone; and operating the third traversing element to move the third quenching device circumferentially within the end zone.

4. The method as recited in claim 3, wherein the step of operating the third traversing element includes moving the third quenching device back and forth in the circumferential direction.

5. The method as recited in claim 3, wherein the step of removing the preheat inductor from the bearing ring includes operating the third traversing element to simultaneously move the third quenching device from an inoperative position to an operative position on the bearing ring.

6. The method as recited in claim 3, wherein:

a fourth quenching device is mounted on the third traversing element;

the step of removing the preheat inductor and at least one of the first and second quenching devices includes removing both of the first and second quenching devices;

the step of positioning the third quenching device on the bearing ring includes positioning the fourth quenching device on the bearing ring; and the step of operating the third traversing device includes moving both of the third and fourth quenching devices circumferentially within the end zone.

7. The method as recited in claim 6, wherein the step of operating the third traversing element includes moving the third and fourth quenching devices back and forth in the circumferential direction.

8. The method as recited in claim 6, wherein:

the first traversing element moves the first inductor and the second traversing element moves the second inductor until the first and second inductors abut within the end zone; and the method further comprises the steps of:

removing the first and second inductors from the bearing ring after the first and second inductors abut; and continuing to operate the third traversing element after removal of the first and second inductors from the bearing ring so as to move the third and fourth quenching devices circumferentially toward each other until the third and fourth quenching devices abut.

9. The method as recited in claim 8 wherein the step of continuing to operate the third traversing element includes moving the third and fourth quenching devices circumferentially away from each other and alternatively toward each other such that the third and fourth quenching devices are pivoted back and forth in the circumferential direction.

10. The method as recited in claim 3, wherein:

the step of removing at least one of the first and second quenching devices from the bearing ring includes removing both of the first and second quenching devices from the bearing ring;

the step of positioning the third quenching device on the bearing ring to replace one of the first and second inductors includes replacing the first quenching device;

the step of operating the third traversing element to move the third quenching device includes moving the third quenching device within a portion of the end zone along the first half of the circumference of the bearing ring; and the method further comprises the steps of:

providing a fourth quenching device mounted on a fourth traversing element;

positioning the fourth quenching device on the bearing ring to replace the second quenching device; and operating the fourth traversing element such that the fourth quenching device moves within a portion of the end zone along the second half of the circumference of the bearing ring.

11. A method of induction-hardening a bearing ring, the method comprising the steps of:

providing a first inductor and a first quenching device mounted on a first traversing element, a second inductor and a second quenching device mounted on a second traversing element, and a third quenching device mounted on a third traversing element;

positioning the first and second inductors at a start zone on the bearing ring;

operating the first traversing element such that the first inductor is moved circumferentially from the start zone toward the end zone along a first half of the circumference of the bearing ring while the first inductor heats the bearing ring and the first quenching device quenches portions of the bearing ring heated by the first inductor;

operating the second traversing element such that the second inductor is moved circumferentially from the start zone toward the end zone along a second half of the circumference of the bearing ring while the second inductor heats the bearing ring and the second quenching device quenches portions of the bearing ring heated by the second inductor;

removing at least one of the first and second quenching devices from the bearing ring when the first and second inductors enter the end zone;

positioning the third quenching device on the bearing ring to replace the one of the first and second quenching devices removed from the bearing ring; and operating the third traversing element such that the third quenching device moves circumferentially within and quenches the end zone;

wherein the step of operating the third traversing element includes moving the third quenching device circumferentially back and forth within the end zone.

12. The method as recited in claim 11, wherein:

the method further comprises the step of providing a fourth quenching device mounted on the third traversing element;

the step of removing at least one of the first and second quenching devices from the bearing ring includes removing both of the first and second quenching devices from the bearing ring;

the step of positing the third quenching device on the bearing ring includes positioning the third quenching device on the bearing ring to replace the first quenching device and positioning the fourth quenching device on the bearing ring to replace the second quenching device; and the step of operating the third traversing element includes moving both of the third and fourth quenching devices circumferentially within the end zone.

13. The method as recited in claim 12, wherein the step of operating the third traversing element includes pivoting the third and fourth quenching devices back and forth in the circumferential direction.

14. The method as recited in claim 12, wherein:
the first traversing element moves the first inductor and the second traversing element moves the second inductor until the first and second inductors abut within the end zone; and
the method further comprises the steps of:
  removing the first and second inductors from the bearing ring after the first and second inductors abut; and
  continuing to operate the third traversing element to move the third and fourth quenching devices circumferentially toward each other after removal of the first and second inductors from the bearing ring until the third and fourth quenching devices abut.

15. The method as recited in claim 11, further comprising the steps of:
  providing a preheat inductor mounted on the third traversing element;
  operating the third traversing element to move the preheat inductor within the end zone while the preheat inductor heats the end zone when the first traversing element moves the first inductor from the start position toward the end zone and the second traversing element moves the second inductor from the start position toward the end zone; and
  removing the preheat inductor from the bearing ring when the first and second inductors enter the end zone.

16. The method as recited in claim 15, wherein the step of operating the third traversing element to move the preheat inductor circumferentially within the end zone includes moving the preheat inductor so as to traverse a portion of each one of the first and second halves of the circumference of the bearing ring while the preheat inductor heats the bearing ring.

17. The method as recited in claim 15, wherein the step of removing the preheat inductor from the bearing ring includes operating the third traversing element to simultaneously move the third quenching device from an inoperative position to an operative position on the bearing ring.

* * * * *